(12) United States Patent
Gerraty

(10) Patent No.: US 8,412,926 B1
(45) Date of Patent: Apr. 2, 2013

(54) USING FILE METADATA FOR DATA OBFUSCATION

(75) Inventor: Simon J. Gerraty, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 1328 days.

(21) Appl. No.: 11/734,058

(22) Filed: Apr. 11, 2007

(51) Int. Cl.
H04L 29/06 (2006.01)

(52) U.S. Cl. ......... 713/150; 713/167; 380/255; 380/278

(58) Field of Classification Search .................... 713/167
See application file for complete search history.

(56) References Cited

U.S. PATENT DOCUMENTS

| | | | | |
|---|---|---|---|---|
| 5,495,533 A * | 2/1996 | Linehan et al. | ............... | 713/155 |
| 5,633,932 A * | 5/1997 | Davis et al. | ................... | 713/176 |
| 6,947,556 B1 * | 9/2005 | Matyas et al. | ................. | 380/29 |
| 7,010,689 B1 * | 3/2006 | Matyas et al. | ............... | 713/168 |
| 7,095,853 B2 * | 8/2006 | Morishita | ..................... | 380/201 |
| 7,380,120 B1 * | 5/2008 | Garcia | .......................... | 713/160 |
| 7,681,034 B1 * | 3/2010 | Lee et al. | ....................... | 713/164 |
| 7,703,140 B2 * | 4/2010 | Nath et al. | ....................... | 726/26 |
| 2002/0041337 A1 * | 4/2002 | Candelore | .................... | 348/591 |
| 2002/0059522 A1 * | 5/2002 | Hirano et al. | ................. | 713/193 |
| 2003/0135464 A1 * | 7/2003 | Mourad et al. | .................. | 705/50 |
| 2003/0154378 A1 * | 8/2003 | Hirano | ........................... | 713/176 |
| 2004/0225890 A1 * | 11/2004 | Kang et al. | .................... | 713/193 |
| 2005/0081039 A1 * | 4/2005 | Lee et al. | ....................... | 713/176 |
| 2005/0216730 A1 * | 9/2005 | Morino et al. | ................. | 713/153 |
| 2006/0075258 A1 * | 4/2006 | Adamson et al. | ............. | 713/189 |
| 2007/0019810 A1 * | 1/2007 | Suzue | ............................. | 380/203 |
| 2007/0074038 A1 * | 3/2007 | Arenburg et al. | ............... | 713/181 |
| 2007/0112844 A1 * | 5/2007 | Tribble et al. | ............... | 707/102 |
| 2007/0140488 A1 * | 6/2007 | Dharmaji et al. | ............. | 380/212 |
| 2007/0143632 A1 * | 6/2007 | Matsuzaki et al. | ............ | 713/193 |
| 2007/0233606 A1 * | 10/2007 | Zweig et al. | ...................... | 705/57 |
| 2007/0280476 A1 * | 12/2007 | Matsushita | ..................... | 380/44 |
| 2008/0024350 A1 * | 1/2008 | Srinivasan et al. | ............. | 341/158 |
| 2008/0052328 A1 * | 2/2008 | Widhelm et al. | ............. | 707/204 |
| 2008/0104417 A1 * | 5/2008 | Nachtigall et al. | ............ | 713/193 |
| 2008/0123863 A1 * | 5/2008 | Bade et al. | ...................... | 380/282 |
| 2008/0165958 A1 * | 7/2008 | Matsushita | ..................... | 380/44 |
| 2009/0100268 A1 * | 4/2009 | Garcia et al. | ................... | 713/184 |
| 2009/0193521 A1 * | 7/2009 | Matsushima et al. | ........... | 726/22 |

OTHER PUBLICATIONS

Lin et al., "Advances in Digital Video Content Protection," 2005, IEEE, pp. 171-176.*
Miller et al., "Strong Security for Distributed File Systems," 2001, IEEE, pp. 34-41.*

* cited by examiner

*Primary Examiner* — Luu Pham
(74) *Attorney, Agent, or Firm* — Harrity & Harrity, LLP

(57) ABSTRACT

A system and method may assist in securing data for transmission to a receiving entity. Received data may include metadata associated therewith. The data may be encrypted using an encryption key encoded within selected portions of the metadata, where the selection of the selected portions is based on a scheme shared with the receiving entity. The encrypted data including the metadata may be transferred to the receiving entity. The receiving entity may decrypt the encrypted data using the selected portions of the metadata.

22 Claims, 5 Drawing Sheets

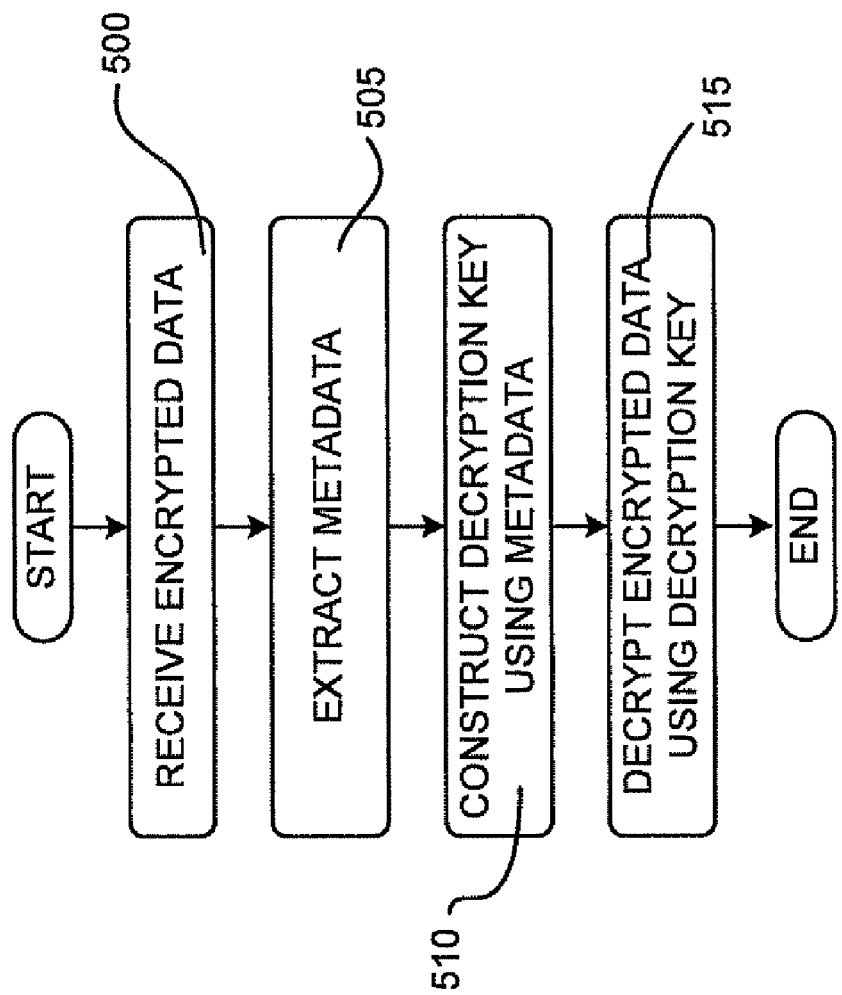

USING FILE METADATA FOR DATA OBFUSCATION

BACKGROUND

1. Field of the Invention

Implementations relate generally to data security, and more particularly, to efficiently providing data security in an easily implemented manner.

2. Description of Related Art

The ability to exchange data securely is of paramount importance in today's information age. The term "security" or "securely" may have several different meanings, depending on the level of protection considered necessary and practical. In one aspect, data may be computationally protected, such that only the most aware and technically competent interceptor may uncover or view the secured data. Systems such as public key encryption or shared secret key encryption may be deemed computationally secure in that, absent knowledge of a secret key, decryption of the data by an interceptor would be technically difficult. Alternatively, less secure systems may be implemented which prevent the casual or unintended dissemination of protected data, yet do not fully protect the data to the level afforded by the more computationally intensive systems.

Unfortunately, implementing a more desirable computationally intensive security scheme may cause operational problems for the parties desiring to share the data. For example, a public key system requires that the encrypting party have knowledge of each recipient's public key. This may prove problematic in the efficient generation and dissemination of the desired data. Similarly cumbersome, a shared secret key system would require that the encrypting party exchange a private key with the receiving party and would further require that the decrypting party receive the private key and utilize the key to decrypt the received data. Unfortunately, this system requires additional obligations on the part of the receiving party that may be difficult to implement or enforce in practice.

SUMMARY

According to one aspect, a method may include receiving data having metadata elements associated therewith; encrypting the data using an encryption key; and encoding the encryption key in the metadata elements, such that the presence of the encryption key in the metadata is obfuscated; and transferring the encrypted data to a recipient.

According to another aspect, a device for securing data may include means for receiving data having metadata elements associated therewith; means for constructing an encryption key based on at least one of the metadata elements; means for encrypting the data based on the encryption key; and means for storing the encrypted data for delivery to a recipient.

According to a further aspect, a device is provided for facilitating exchange of secure data, the device including logic configured to receive data having metadata elements associated therewith; encrypt the data using at least one of the metadata elements, the encrypted data including at least some of the metadata elements; and store the encrypted data.

According to still another aspect, a device for securing data is provided including logic configured to receive data having metadata elements associated therewith; construct an encryption key based on at least one of the metadata elements; encrypt the data based on the encryption key; and store the encrypted data for delivery to a recipient.

According to another aspect, a device is provided for decrypting received data, the device including logic configured to receive encrypted data having metadata elements associated therewith; decrypt the encrypted data using at least one of the metadata elements; and store the decrypted data.

According to yet another aspect, a method may include receiving data having metadata embedded therein; constructing an encryption key based on selected elements of the metadata, wherein selection of the selected elements is based on a scheme known to a receiving entity; encrypting the data using the encryption key; and storing the encrypted data for transmission to the receiving entity, where the metadata is embedded within the encrypted data.

BRIEF DESCRIPTION OF THE DRAWINGS

The accompanying drawings, which are incorporated in and constitute a part of this specification, illustrate an embodiment of the invention and, together with the description, explain the invention. In the drawings.

FIG. 5 is a flowchart of an exemplary process for decrypting received data in accordance with one implementation.

DETAILED DESCRIPTION

The following detailed description of the invention refers to the accompanying drawings. The same reference numbers in different drawings may identify the same or similar elements. Also, the following detailed description does not limit the invention.

Systems and methods described herein may provide or increase security during the transmission or storage of data. In one implementation, metadata associated with the data (i.e., information associated with the data, but not actually part of the data) may be used to encrypt or otherwise obfuscate the data. Such an obfuscation scheme increases data security while enabling rapid and efficient decryption or decoding upon reception.

Figure 1:
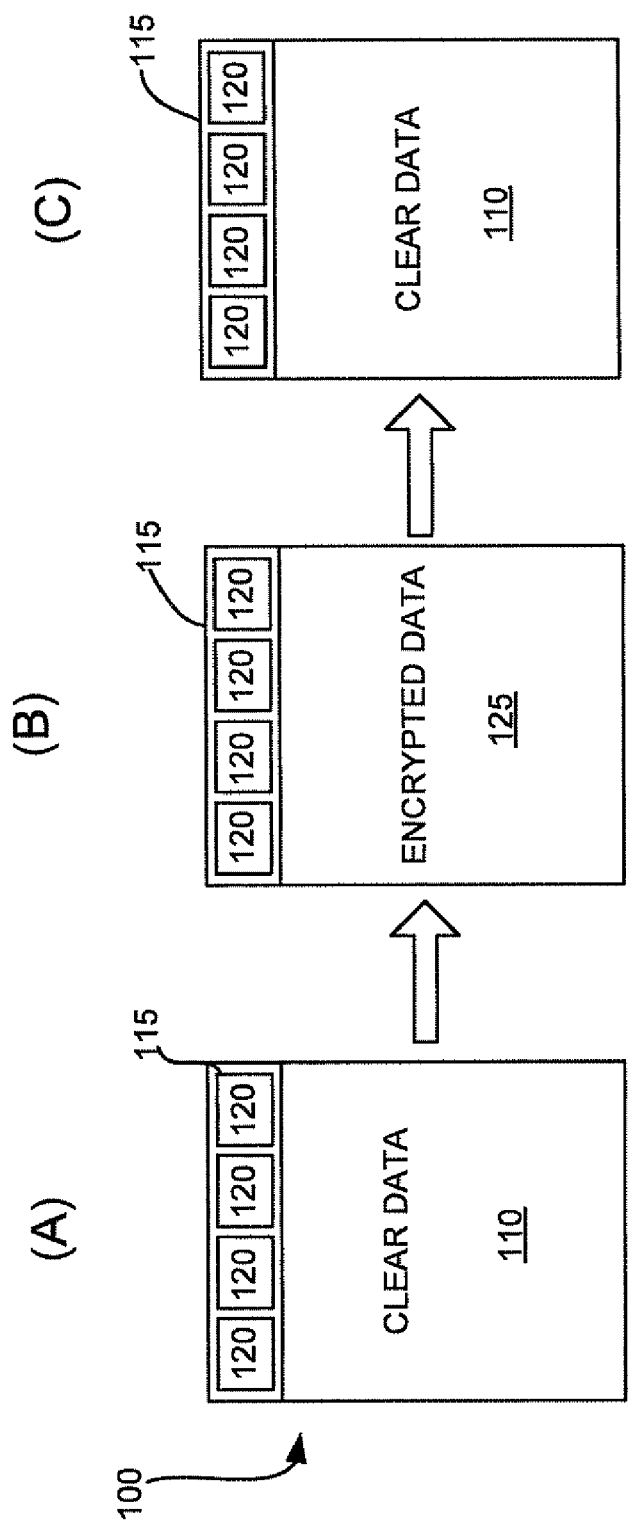
FIG. 1 is an exemplary diagram illustrating one aspect of the invention.

FIG. 1 is an exemplary diagram illustrating one aspect of the invention. As shown in (A), data may be initially present in a clear or normal text (e.g., non-ciphered) format 100 having a data portion 110 and a metadata portion 115 associated with the data portion. Metadata 115 may include elements 120 such as the filename, the author or creator, the creation date, the modification date, file permissions, etc.

Moving to (B), data 110 may then be encrypted or ciphered using an encryption key encoded within one or more of the metadata elements 120 to generate encrypted data 125. In this manner, selected metadata elements 120 or a combination of metadata elements 120 may be considered to be the encryption key. Alternatively, variants or modifications to metadata elements 120, may be used to further obfuscate the data 110. Once encrypted, the data is illegible and meaningless absent knowledge of the encryption key used to encrypt the data. In (C), the data may be decrypted by examining the metadata portion 115, reconstructing the key, and applying the key to the data.

"Data" as the term is used herein, is to be broadly interpreted to include any machine-readable and machine-storable work product. Data may include, for example, a text file, a word processing file, a hardware configuration file, an e-mail, a web site, a combination of files, one or more files with embedded links to other files, an electronic version of printed text, etc. "Metadata" as the term is used herein, is to be broadly interpreted to include any data or information used to describe or index other data. Metadata may be associated with or embedded in the data that it describes. For example, a word processing or text file, may have metadata associated therewith relating to the author of the file or the name of the file.

Figure 2:
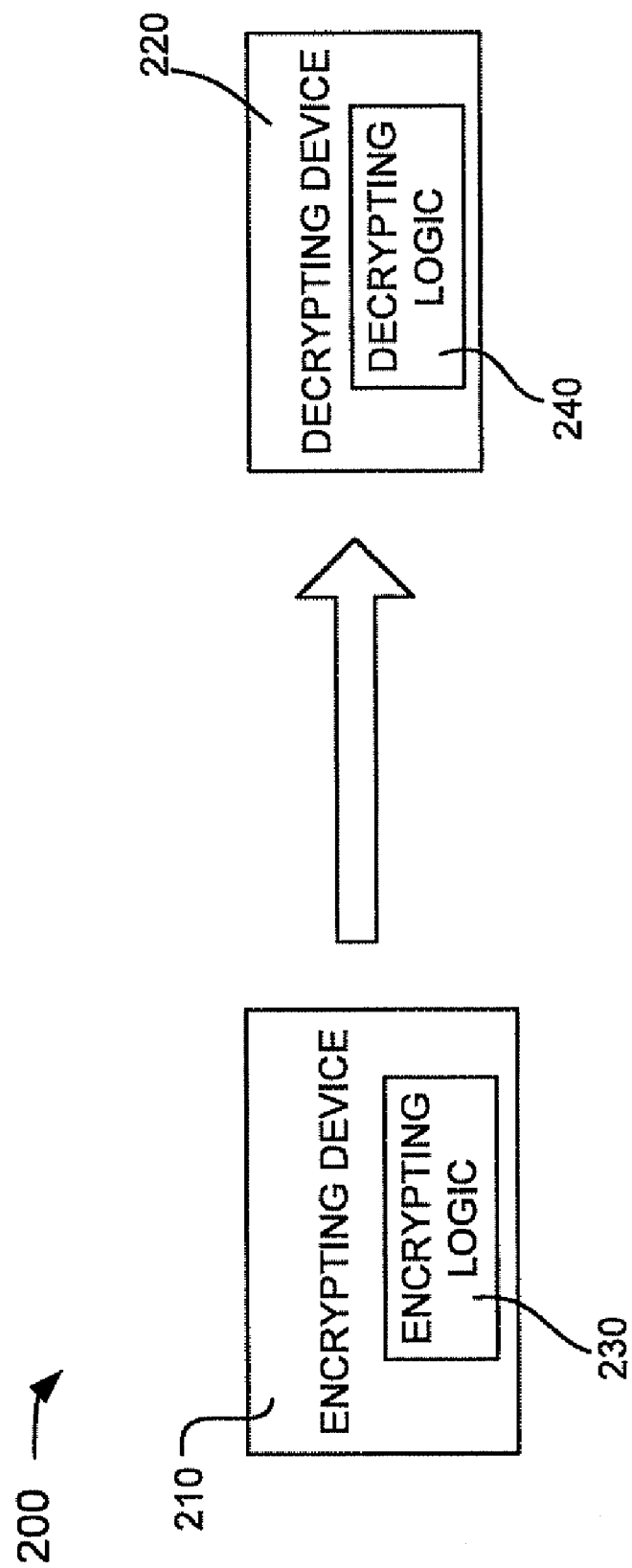
FIG. 2 is an exemplary diagram of an arrangement in which systems and methods consistent with one embodiment may be implemented.

FIG. 2 is an exemplary diagram of an arrangement 200 in which systems and methods consistent with one embodiment may be implemented. Arrangement 200 may include an encrypting device 210 and a decrypting device 220 for receiving information from encrypting device 210. As described in additional detail below, information may be transferred between device 210 and device 220 in any suitable manner. For example, device 210 and device 220 may be connected via a network (i.e., a wired or wireless network connection). Alternatively, information may be manually transferred from device 210 to device 220, for example, by courier, hand-carrying, mail, etc. While only two network devices 210 ad 220 have been illustrated for simplicity, in practice, there may be more or fewer devices 210 and 220. Also, in some instances, encrypting device 210 and decrypting device 220 may be the same device. Further, in some instances encrypting device 210 may perform a function of decrypting device 220 and decrypting device 220 may perform a function of encrypting device 210.

Encrypting device 210 may include encrypting logic 230 for constructing the encryption key from one or more metadata elements and encrypting data using the constructed key. Similarly, decrypting device 220 may include decryption logic 240 for extracting the one or more metadata elements used to construct the key and decrypting the data. In one implementation, decrypting device 220 may be a router, server, or other network device adapted to receive configuration information from the encrypting device 210.

Exemplary Configuration

Figure 3:
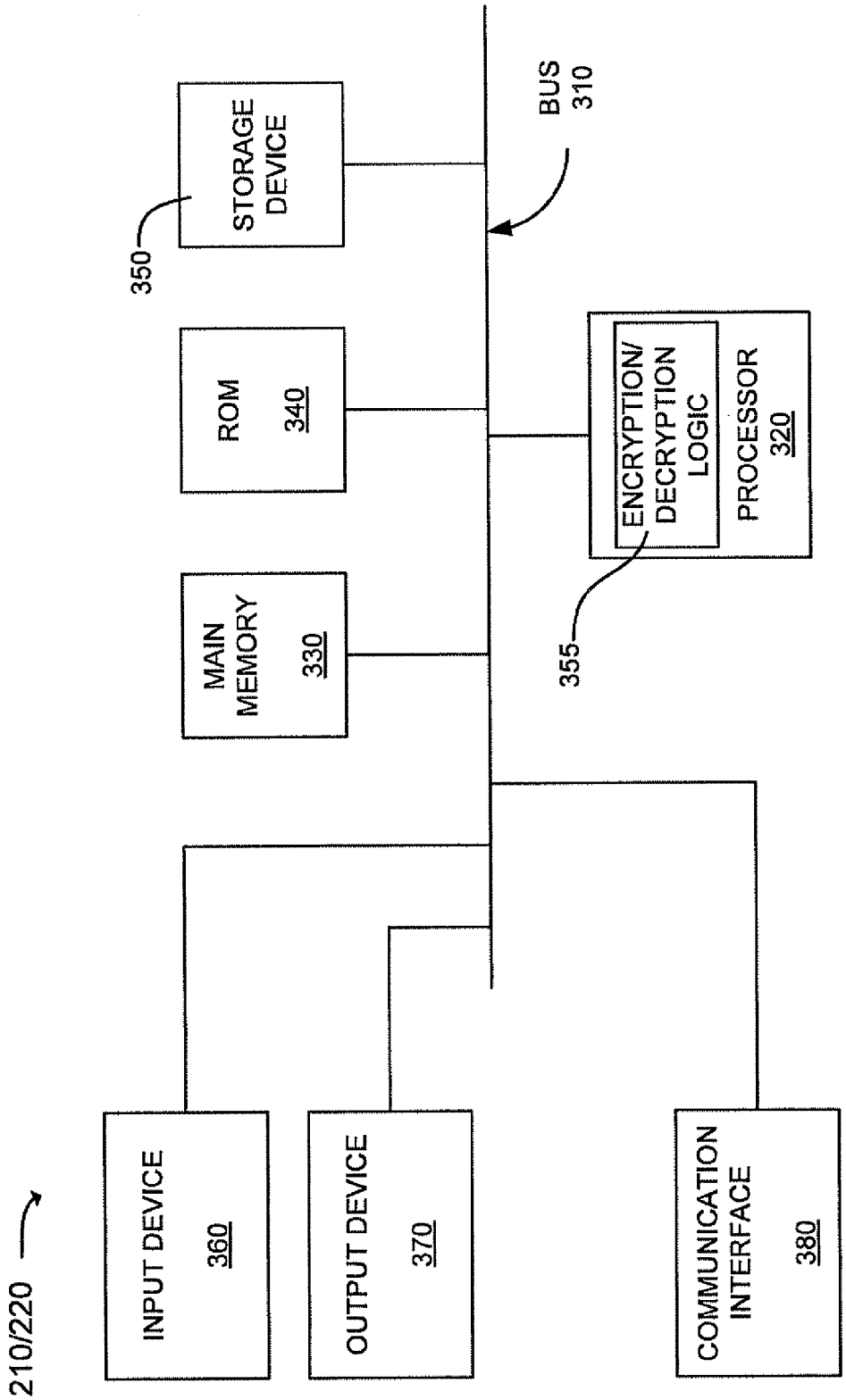
FIG. 3 is an exemplary diagram of a encrypting or decrypting device of FIG. 2.

FIG. 3 is an exemplary diagram of an encrypting device or decrypting device (hereinafter called "encrypting/decrypting device"), which may correspond to either of encrypting device 210 or decrypting device 220. The encrypting/decrypting device may include a bus 310, a processor 320, a main memory 330, a read only memory (ROM) 340, a storage device 350, an input device 360, an output device 370, and a communication interface 380. Bus 310 may include a path that permits communication among the elements of the encrypting/decrypting device.

Processor 320 may include a processor, microprocessor, or processing logic that may interpret and execute instructions. Furthermore, processor 320 may include encryption/decryption logic 355 for executing encryption instructions on received data. Main memory 330 may include a random access memory (RAM) or another type of dynamic storage device that may store information and instructions for execution by processor 320. ROM 340 may include a ROM device or another type of static storage device that may store static information and instructions for use by processor 320. Storage device 350 may include a magnetic and/or optical recording medium and its corresponding drive.

Input device 360 may include a mechanism that permits an operator to input information to the encrypting/decrypting device, such as a keyboard, a mouse, a pen, voice recognition and/or biometric mechanisms, etc. Output device 370 may include a mechanism that outputs information to the operator, including a display, a printer, a speaker, etc. Communication interface 380 may include any transceiver-like mechanism that enables the encrypting/decrypting device to communicate with other devices and/or systems. For example, communication interface 380 may include mechanisms for communicating with another device or system via a network, such as a computer network.

As will be described in detail below, the encrypting/decrypting device, may perform certain data processing-related operations. The encrypting/decrypting device may perform these operations in response to processor 320 and encrypting/decrypting logic 355 executing software instructions contained in a computer-readable medium, such as memory 330. A computer-readable medium may be defined as a physical or logical memory device and/or carrier wave.

The software instructions may be read into memory 330 from another computer-readable medium, such as data storage device 350, or from another device via communication interface 380. The software instructions contained in memory 330 may cause processor 320 to perform processes that will be described later. Alternatively, hardwired circuitry may be used in place of or in combination with software instructions to implement processes in various aspects of the invention. Thus, implementations of the invention are not limited to any specific combination of hardware circuitry and software.

Exemplary Processing

Figure 4:
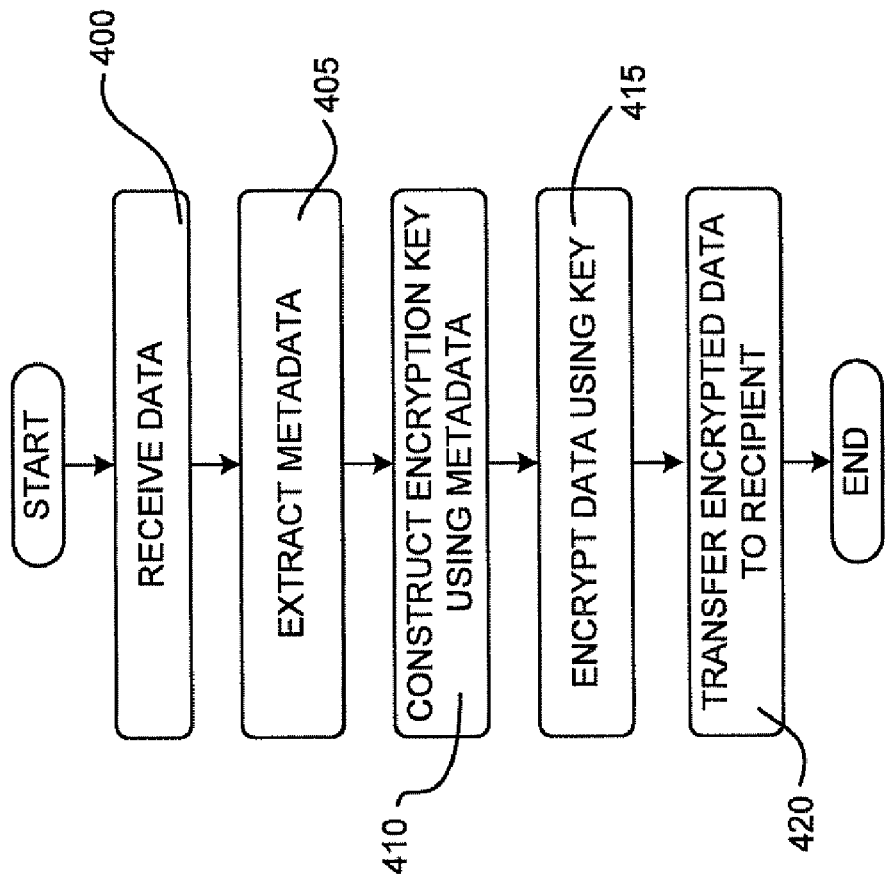
FIG. 4 is a flowchart of an exemplary process for encrypting or obfuscating data in one implementation.

FIG. 4 is a flowchart of an exemplary process for encrypting or obfuscating data in one implementation. The processing of FIG. 4 may be performed by one or more software and/or hardware components within encrypting device 210 or a combination of encrypting devices 210. In another implementation, the processing may be performed by one or more software and/or hardware components within another device or a group of devices separate from or including encrypting device 210.

Processing may begin with receipt of data and its associated metadata for encryption (block 400). As discussed briefly above, exemplary data may include text or word processing files, configuration settings, media files, etc. Upon receipt, metadata associated with or embedded within the received data may be extracted (block 405). Using a predetermined scheme, an encryption key may be constructed based on at least a portion of the metadata (block 410). Alternatively, an encryption key may be encoded into the metadata elements using a predefined algorithm. The data may be encrypted using the constructed encryption key (block 415). The encrypted data may maintain the same or similar metadata to that associated with the unencrypted data received at block 405. In one implementation, a filename associated with the received data may be used as the encryption key. In another implementation, combinations of metadata may be used, such as the filename and the "permissions" associated with the file (as is known, data may be assigned permissions which limit what recipients of the data may do with the data). Other types of metadata or combinations of metadata may also be used, such as creation date, modification date, file type, creator, file size, etc. For example, in a filesystem that provides metadata including creation, modification, and access dates, these three dates may be combined to provide a large encryption key space. Provided that typical filesystem semantics are maintained (creation date<=modification date<=access date<=current date) the key would not be detectable from casual observation.

In still another embodiment, variations or modifications to the values associated with the metadata elements may be used to construct the encryption key. For example, the "permissions" may be modified from "Modify" to "Read Only", and the modified permissions metadata may be used to construct the encryption key. An additional example may include constructing the encryption key by modifying the value associated with the creation date metadata element by a predetermined amount and using the modified date to construct the key. At this point, the data is ready for secure storage or transfer to another device or entity (block 420). In one embodiment, the encrypted data may be electronically transferred to a receiving device. In yet another implementation, the encrypted data may be stored onto a portable storage device (e.g., a flash memory key, portable hard drive, media player, personal digital assistant, personal computer, or the like). The encrypted data may then be physically transferred to a site of a receiving device.

FIG. 5 is a flowchart of an exemplary process for decrypting received data in accordance with one implementation. Processing may begin upon receipt of encrypted data at a decrypting device (block 500). As described above, the encrypted data may be any type of data including, for example, configuration settings, word processing or text files, media files, etc. Upon receipt of the encrypted data, metadata associated or embedded with the encrypted data may be extracted (block 505). Using the predetermined scheme, portions of the extracted metadata may be used to construct a decryption key (block 510). In one implementation, the decryption key may be the same as the encryption key used to encrypt the data. That is, the encryption scheme used may be a symmetric scheme or cipher. In other implementations, the decryption key may be computationally different from the encryption key, but usable to decrypt data encrypted using the encryption key. As is known, such an asynchronous scheme may include additional key complexity or length. In either case, the receiving device may be preconfigured to use the appropriate decryption key. The encrypted data may then be decrypted using the constructed decryption key (block 515).

By providing the ingredients or components associated with the encryption key within the transferred data itself, a receiving device (for example, decrypting device 220) configured to recognize those ingredients or components and having a stored algorithm to generate a decryption key may be able to automatically decrypt the received data without user intervention.

CONCLUSION

Systems and methods consistent with the aspects of the invention may provide enhanced data security while simultaneously providing for efficient implementation. As described above, selected portions of the metadata associated with the data to be secured may form the basis of the encryption key used to encrypt the data. By sharing the type and arrangement of the metadata used, a receiving party may automatically construct a similar decryption key from the metadata associated with the received encrypted data. In one embodiment, such decryption may be done without requiring any direct user or manual intervention, thereby facilitating increased efficiency in receiving and decryption the secured data.

The foregoing description of preferred embodiments of the present invention provides illustration and description, but is not intended to be exhaustive or to limit the invention to the precise form disclosed. Modifications and variations are possible in light of the above teachings or may be acquired from practice of the invention.

For example, while series of acts have been described with regard to FIGS. 4 and 5, the order of the acts may be modified in other implementations consistent with the principles of the invention. Further, non-dependent acts may be performed in parallel.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the invention. Thus, the operation and behavior of the aspects were described without reference to the specific software code—it being understood that one of ordinary skill in the art would be able to design software and control hardware to implement the aspects based on the description herein.

Further, certain portions of the invention may be implemented as "logic" or a "component" that performs one or more functions. This logic may include hardware, such as an application specific integrated circuit or a field programmable gate array, software, or a combination of hardware and software.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method for securing data, the method comprising:
    receiving, at a device, data and metadata elements,
        the metadata elements being associated with the data and embedded within the data;
    extracting, by the device, the metadata elements from the received data;
    selecting one or more of the extracted metadata elements;
    modifying the selected one or more extracted metadata elements;
    generating, by the device, an encryption key based on the extracted metadata elements and the modified one or more of the extracted metadata elements,
        the encryption key including the modified one or more of the extracted metadata elements;
    encrypting, by the device, the received data using the encryption key;
    encoding, by the device, the encryption key within the associated metadata elements,
    enabling a receiving device to decrypt the encrypted data using the encoded encryption key within the metadata elements; and
    transferring, by the device, the encrypted data and the associated metadata elements to the receiving device.

2. The method of claim 1, further comprising:
    receiving other encrypted data associated with other metadata elements;
    selecting one of the other metadata elements based on the predetermined scheme;
    modifying a value of the one of the other metadata elements;
    constructing a decryption key based on the modified value of the one of the other metadata elements; and decrypting the encrypted data, using the constructed decryption key, to generate the data.

3. The method of claim 2, where the encryption key and the decryption key comprise computationally different keys.

4. The method of claim 1, where selecting the one or more of the extracted metadata elements includes:
selecting a combination of the extracted metadata elements;
where modifying the selected one or more of the extracted metadata elements includes:
modifying the selected combination of the extracted metadata elements; and
where generating the encryption key includes:
generating the encryption key based on the modified combination of the extracted metadata elements,
the generated encryption key including the modified combination of the extracted metadata elements.

5. The method of claim 4, where the combination of the extracted metadata elements includes:
a creation date of the received data, a modification date of the received data, and an access date of the received data.

6. The method of claim 4, where generating the encryption key further includes:
selecting the combination of the extracted metadata elements based on a particular scheme.

7. The method of claim 1, where modifying the one or more of the extracted metadata elements includes:
changing a value of the one of the extracted metadata elements.

8. The method of claim 1, where the encryption key comprises selected portions of the extracted metadata elements.

9. The method of claim 8, where selecting the one or more of the extracted metadata elements further comprises:
selecting the selected portions of the extracted metadata elements based on a particular scheme.

10. The method of claim 1, where the one of the extracted metadata elements includes at least one of a filename, a creation date, a creator name, a file size, a permission, or a modification date.

11. The method of claim 1, where the transferring further comprises:
storing the encrypted data and the associated metadata elements on a memory device; and
allowing the receiving device to access the memory device to retrieve the encrypted data and the associated metadata elements.

12. The method of claim 1, where the transferring further comprises:
transmitting the encrypted data and the associated metadata elements to the ether receiving device via a network.

13. A system for securing data, the system comprising:
an input device comprising a processor configured to:
receive data and metadata elements, the metadata elements being associated with the data and embedded within the data;
extract the associated metadata elements from the data,
select one or more of the associated extracted metadata elements,
modify the selected one or more of the extracted metadata elements,
generate an encryption key based on the extracted metadata elements and the modified one or more of the extracted metadata elements,
the encryption key including the modified one or more of the extracted metadata elements,
encrypt the data using the encryption key,
encode the encryption key within the associated metadata elements, and
store the encrypted data and the associated metadata elements for delivery to a recipient,
the associated metadata elements stored with the encrypted data comprising the associated metadata elements included with the received data.

14. The system of claim 13, where, when selecting the one or more of the extracted metadata elements, the processor of the input device is further configured to:
select a combination of the extracted metadata elements, the combination of the extracted metadata elements including the one or more of the extracted metadata elements;
where, when modifying the selected one or more of the extracted metadata elements, the processor of the input device is further configured to:
modify the selected combination of the extracted metadata elements; and
where, when generating the encryption key, the processor of the input device is further configured to:
generate the encryption key using the selected combination of the extracted metadata elements.

15. The system of claim 13, where the processor of the input device is further configured to:
select the one or more of the extracted metadata elements based on a particular scheme.

16. A device for facilitating exchange of secure data, the device comprising:
a processor, at least partially implemented in hardware; and
a memory storing instructions that, when executed by the processor, cause the processor to:
receive data and metadata elements, the metadata elements being associated with the data and embedded within the data,
extract the associated metadata elements from the data,
select one or more of the extracted metadata elements,
modify the selected one or more of the extracted metadata elements,
generate an encryption key based on the extracted metadata elements and the modified one or more of the extracted metadata elements,
the generated encryption key including the modified one or more of the extracted metadata elements,
encrypt the received data using the encryption key,
encode the encryption key within the associated metadata elements, and
store the encrypted data and the associated metadata elements for delivery to a recipient,
the associated metadata elements stored with the encrypted data comprising the associated metadata elements included with the received data.

17. The device of claim 16, where the instructions when executed by the processor, further cause the processor to:
forward the encrypted data and the associated metadata elements to a receiving device.

18. The device of claim 16, where the device is a router.

19. A method comprising:
receiving, at a device, data and metadata,
the metadata being associated with the data and embedded within the data;
extracting, by the device the metadata;
selecting an element of the extracted metadata based on a scheme known to a receiving entity;
modifying the selected element;
generating, by the device, an encryption key based on the extracted metadata and the modified element, the generated encryption key including the modified element, encrypting, by the device, the data using the encryption key;
encoding the encryption key within the metadata; and
transmitting, by the device, the encrypted data to the receiving entity,
the metadata including the encryption key being embedded within the encrypted data, enabling the receiving entity to decrypt the encrypted data using the encoded encryption key within the metadata.

20. The method of claim 19, further comprising:
receiving, at the receiving entity, the encrypted data;
selecting, by the receiving entity, the modified element based on the scheme;
generating, without user intervention, a decryption key using the modified element; and
decrypting the encrypted data using the decryption key.

21. The method of claim 19, where the scheme comprises:
modifying a value associated with a creation date data element of the metadata, a modification date data element of the metadata, and an access date data element of the metadata.

22. The method of claim 20, where the decryption key comprises a computationally different key than the encryption key.

* * * * *